United States Patent
Wilson et al.

(10) Patent No.: US 9,420,005 B1
(45) Date of Patent: *Aug. 16, 2016

(54) CONFIGURING POLICY SETTINGS ON CLIENT COMPUTING DEVICES

(71) Applicant: Google Inc., Mountain View, CA (US)

(72) Inventors: Glenn Wilson, Los Angeles, CA (US); Sumit Gwalani, Mountain View, CA (US); William Alexander Drewry, Nashville, TN (US); Mattias Stefan Nissler, Hamburg (DE)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,205

(22) Filed: Mar. 20, 2014

Related U.S. Application Data

(63) Continuation of application No. 13/348,574, filed on Jan. 11, 2012, now Pat. No. 8,701,157.

(60) Provisional application No. 61/553,054, filed on Oct. 28, 2011.

(51) Int. Cl.
 *H04L 29/06* (2006.01)

(52) U.S. Cl.
 CPC ........................................ *H04L 63/20* (2013.01)

(58) Field of Classification Search
 CPC ........................................................ H04L 63/20
 USPC ............................................................. 726/1
 See application file for complete search history.

(56) References Cited

U.S. PATENT DOCUMENTS

| | | | |
|---|---|---|---|
| 6,957,261 B2 | 10/2005 | Lortz | |
| 7,079,649 B1 | 7/2006 | Bramhill et al. | |
| 7,136,903 B1* | 11/2006 | Phillips et al. | 709/217 |
| 7,298,851 B1 | 11/2007 | Hendricks et al. | |
| 7,546,629 B2 | 6/2009 | Albert | |
| 7,917,521 B2 | 3/2011 | Brown et al. | |
| 8,041,803 B2* | 10/2011 | Yu et al. | 709/224 |
| 8,204,233 B2* | 6/2012 | Groth et al. | 380/286 |
| 8,701,157 B1 | 4/2014 | Wilson | |
| 2007/0271592 A1 | 11/2007 | Noda et al. | |
| 2008/0098478 A1 | 4/2008 | Vaidya et al. | |
| 2008/0140820 A1 | 6/2008 | Snyder et al. | |
| 2008/0301672 A1* | 12/2008 | Rao | G06F 8/61 717/177 |

(Continued)

OTHER PUBLICATIONS

"Public Key Encryption and Digital Signature: How do they work?", 2004, CGI Group Inc.*

(Continued)

*Primary Examiner* — Shawnchoy Rahman
(74) *Attorney, Agent, or Firm* — McDermott Will & Emery LLP

(57) ABSTRACT

Systems and methods for installing policy settings on a client computing device are provided. In some aspects, the client computing device receives policy data and a public key from a server. The policy data are authenticated based on the public key. Policy settings based on the authenticated policy data are installed on the client computing device. Installing the policy settings based on the authenticated policy data on the client computing device includes storing information based on the policy data in a module on the client computing device. The module is secured by the public key from the server and a signature generated on the client computing device to prevent the stored information from being moved or copied by a user of the client computing device.

20 Claims, 4 Drawing Sheets

(56) References Cited

U.S. PATENT DOCUMENTS

2010/0064341 A1 3/2010 Aldera
2013/0115915 A1 5/2013 Tipton et al.

OTHER PUBLICATIONS

Jansen, Wayne, et al. "Assigning and enforcing security policies on handheld devices." Proceedings of the Canadian Information Technology Security Symposium. 2002.*

Fornes Rumbao, Jose Manuel and Francisco Rodriguez Rubio. "Digital Signature Platform on Mobile Devices." Mobility: The First International Conference on Mobile Services, Resources, and Users (2011): 151-157.*

Lei, Yu, Deren Chen, and Zhongding Jiang. "Generating digital signatures on mobile devices." Advanced Information Networking and Applications, 2004. AINA 2004. 18th International Conference on. vol. 2. IEEE, 2004.*

Pash, "Sync your Firefox Extensions and profiles Across Computers," Jun. 26, 2007, <http://lifehacker.com/272113/sync-your-firefox-extensions-and-profiles-across-computers>.

"Firefox Synch," from Wikipedia Dec. 21, 2007, <http://en.wikipedia.org/wiki/firefox_sync>.

* cited by examiner

CONFIGURING POLICY SETTINGS ON CLIENT COMPUTING DEVICES

CROSS-REFERENCE TO RELATED APPLICATIONS

This application is a continuation of U.S. patent application Ser. No. 13/348,574, entitled "CONFIGURING POLICY SETTINGS ON CLIENT COMPUTING DEVICES," filed Jan. 11, 2012, which claims priority under Section 119(e) and the benefit of U.S. Provisional Patent Application Ser. No. 61/553,054, entitled "CONFIGURING POLICY SETTINGS ON CLIENT COMPUTING DEVICES," filed Oct. 28, 2011, the entire disclosures of both of which are incorporated herein by reference.

FIELD

The subject technology generally relates to client-server systems and, in particular, relates to configuring policy settings on client computing devices.

BACKGROUND

Enterprise policy settings may include compliance settings, behavioral settings, software applications, or permissions to access data. Pushing enterprise policy settings to client computing devices may not be secure for the enterprise. Specifically, pushing enterprise policy data to client computing devices may not be secure for the enterprise because a user of the client computing device may copy the enterprise policy settings make them available on multiple different devices, where the enterprise may only intend for the policy settings to be available on one device. As the foregoing illustrates, a technique to automatically configure policy settings on client computing devices, that is secure for both the enterprise pushing the policy settings and the client computing devices to which the policy settings are pushed, may be desirable.

SUMMARY

The disclosed subject matter relates to a computer-implemented method for installing policy settings on a client computing device. The method includes receiving, on the client computing device, policy data and a public key from a server. The method includes authenticating the policy data based on the public key. The method includes installing policy settings based on the authenticated policy data on the client computing device. Installing the policy settings based on the authenticated policy data on the client computing device comprises storing information based on the policy data in a module on the client computing device, the module being secured by the public key from the server and a signature generated on the client computing device to prevent the stored information from being moved or copied by a user of the client computing device.

The disclosed subject matter further relates to a computer-readable medium. The computer-readable medium includes instructions. The instructions include code to receive, on a computer, policy data signed with a public key from a server. The instructions include code to authenticate the policy data based on the public key. The instructions include code to install policy settings based on the authenticated policy data on the computer. Installing the policy settings based on the authenticated policy data on the computer comprises storing information based on the policy data in a module for storing multiple content items, the module residing on the computer, the module being secured by the public key from the server and a signature generated on the computer to prevent the stored information from being moved or copied by a user of the computer.

The disclosed subject matter further relates to a client computing device. The client computing device includes one or more processors and a memory. The memory includes instructions. The instructions include code to receive, at the one or more processors, policy data and a public key from a server. The instructions include code to install policy settings based on the policy data on the client computing device. Installing the policy settings based on the policy data on the client computing device comprises storing information based on the policy data in a module on the client computing device, the module being secured by the public key from the server and a signature generated on the client computing device to prevent the stored information from being moved or copied by a user of the client computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to configuring policy settings on a client computing device. The policy settings may include one or more of: compliance settings, behavioral settings, software applications, permission to access one or more websites, restrictions on accessing one or more websites, read permission in a remote document storage unit, or write permission in a remote document storage unit. If the client computing device has multiple users, the permissions may apply to all of the users or to a subset of the users. The client computing device may transmit information identifying an enterprise account, e.g., login credentials, to a server machine. The login credentials may include a user name, a password, a certificate, or an identifier of the client computing device. In response to the login credentials, the client computing device may receive from the server machine policy data and a public key associated with the server machine. The client computing device may authenticate the policy data based on the public key. Policy settings based on the authenticated policy data may be automatically installed on the client computing device. The policy settings may be stored in a policy settings storage module on the client computing device, and may be associated with both a public key of the server machine and a signature of the client computing device, such that the source and the authenticity of the policy settings may be identified.

Figure 1:
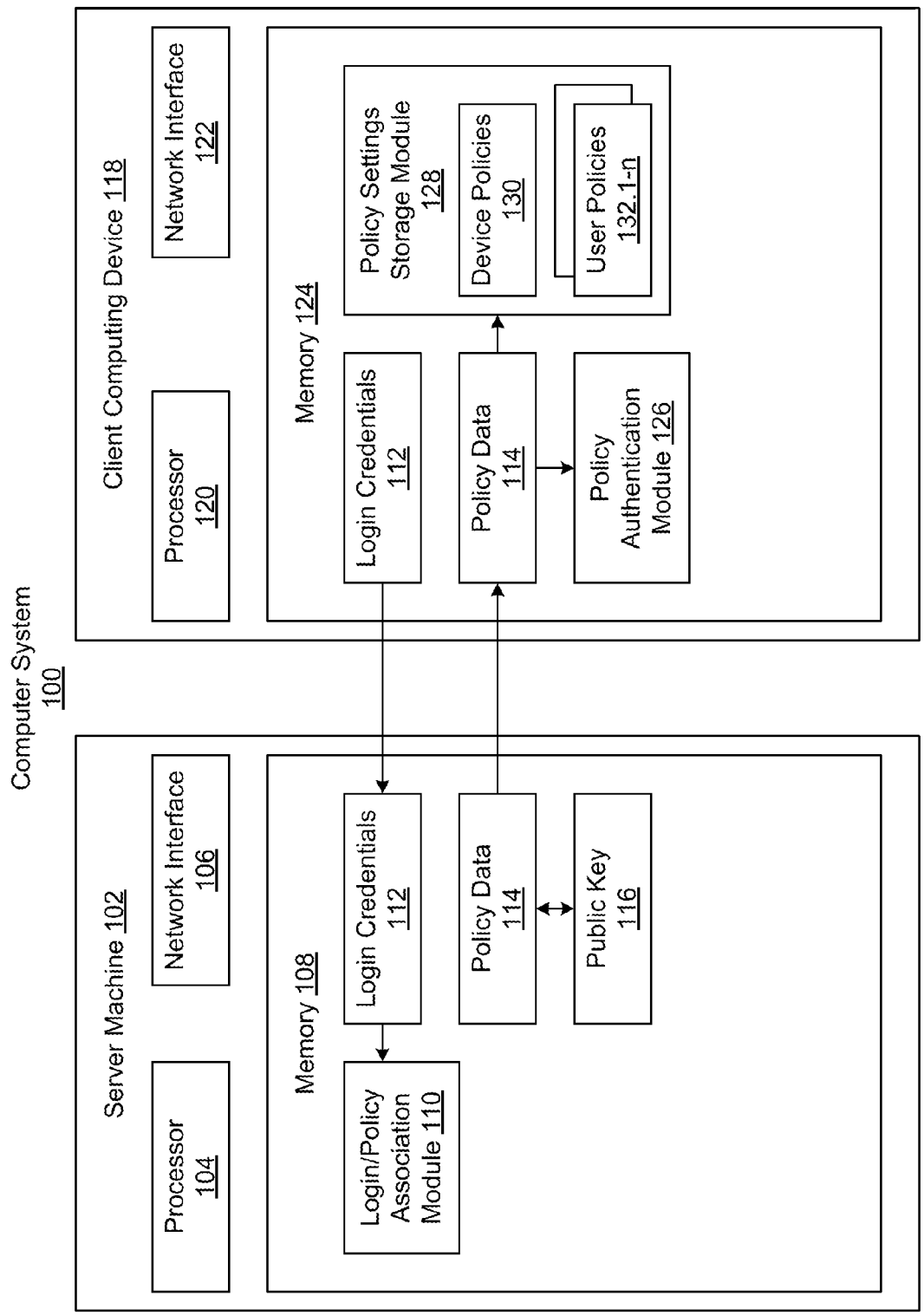
FIG. 1 illustrates an example of a computer system configured to implement configuring policy settings on client computing devices.

FIG. 1 illustrates an example of a computer system 100 configured to implement configuring policy settings on client computing devices.

As shown, the computer system 100 includes a server machine 102 and a client computing device 118. While only one server machine 102 and one client computing device 118 are illustrated, the subject technology may be implemented in conjunction with multiple server machines or multiple client computing devices.

The server machine 102 may be a single server machine, one of multiple server machines, a member of a server farm, or a member of a server cloud. As shown, the server machine 102 includes a processor 104, a network interface 106, and a memory 108. The processor 104 is configured to execute computer instructions that are stored in a computer-readable medium, such as the memory 108. For example, the processor 104 may include a central processing unit (CPU). The network interface 106 is configured to allow the server machine 102 to transmit and receive data in the network. The network interface 106 may include one or more network interface cards (NICs). The memory 108 stores data or instructions. As illustrated, the memory 108 stores a login/policy association module 110, login credentials 112, a policy data 114, and a public key 116.

The login credentials 112 may include one or more of a user name, a password, a certificate or an identifier of a device (e.g., client computing device 118). The login credentials 112 may include cloud-based or cloud-aware login credentials, or non-cloud-based or non-cloud-aware login credentials. The login credentials 112 may be verified in the cloud. In one implementation, any information identifying an enterprise account associated with the device or a user of the device may be used in place of the login credentials 112. In one implementation, the login credentials include login credentials entered by a user when the user logs into an operating system of a client computing device.

The login/policy association module 110 may be configured to receive login credentials 112 and verify that the login credentials 112 are valid. If the login credentials are valid, the login/policy association module may generate or provide policy data 114 associated with the login credentials 112. The policy data 114 may be transmitted to the device associated with the login credentials 112. The policy data 114 may include a policy file or any other information representing policy settings.

The policy data 114 may include or be associated with a representation of compliance policies, behavioral policies, or permissions to be installed on the device. The policy data 114 may also include software applications to be installed on the client computing device. The compliance policies may include an antivirus policy or a virus scan policy. The behavioral policies may include a screen saver policy or a low power mode policy. The permissions may include one or more of permission to access one or more websites, restrictions on accessing one or more websites, read permission in a remote document storage unit, or write permission in a remote document storage unit.

The policy data 114 may be signed by or transmitted in conjunction with the public key 116 of the server machine 102. The public key 116 may identify the source of the policy data 114 as the server machine 102 or another trusted source. The public key 116 may be used to authenticate the policy data 114 as coming from a trusted source. The public key 116 may be configured such that only the server machine 102 or another trusted source can "sign" data with the trusted key, to identify the source of the data, but a substantially arbitrary computing device may verify the authenticity of data associated with the public key 116 based on the public key 116.

The client computing device 118 may be any computing device capable of storing policy settings. The client computing device 118 may be a laptop computer, a desktop computer, a mobile phone, a personal digital assistant (PDA), a tablet computer, a netbook, a physical machine or a virtual machine. Other devices could also implement the functionalities of the client computing device 118. The client computing device 118 may be a dedicated enterprise device associated with an enterprise associated with the server machine 102. Alternatively, the client computing device 118 may not be an enterprise device but may run software associated with the enterprise associated with the server machine 102. The client computing device 118 may include one or more of a keyboard, a mouse, a touch screen, or a display to allow a user to interact with the client computing device 118.

As shown, the client computing device 118 includes a processor 120, a network interface 122, and a memory 124. The processor 120 is configured to execute computer instructions that are stored in a computer-readable medium, such as the memory 124. For example, the processor 120 may include a central processing unit (CPU). The network interface 122 is configured to allow the client computing device 118 to transmit and receive data in the network. The network interface 122 may include one or more network interface cards (NICs). The memory 124 stores data or instructions. In one implementation, all or a portion of the data or instructions stored in the memory 124 may be integrated with an operating system. As illustrated, the memory 108 stores the login credentials 112, the policy data 114, a policy authentication module 126, and a policy settings storage module 128.

The login credentials 112 may include one or more of a user name, a password, a certificate or an identifier of the client computing device 118. In one implementation, any information identifying an enterprise account associated with the client computing device 118 or a user of the device 118 may be used in place of the login credentials 112. The login credentials 112 or the information identifying the enterprise account may be transmitted to a server (e.g., server machine 102).

The policy data 114 may include or be associated with a representation of compliance policies, behavioral policies, or permissions to be installed on the device. The policy data 114 may also include software applications to be installed on the client computing device. The compliance policies may include an antivirus policy or a virus scan policy. The behavioral policies may include a screen saver policy or a low power mode policy. The permissions may include one or more of permission to access one or more websites, restrictions on accessing one or more websites, read permission in a remote document storage unit, or write permission in a remote document storage unit.

The policy authentication module 126 is configured to authenticate the policy data 114, for example, based on a public key or signature associated with the policy data. If the policy authentication module 126 successfully authenticates the policy data 114, policy settings in the policy data 114 may be installed in the client computing device 126.

The policy settings storage module 128 is configured to store policy settings associated with the client computing device 118, for example, policy settings received via the policy data 114. The policy settings may include software applications, compliance policies, behavioral policies, or permissions. The permissions may include positive permissions, e.g., permission to access an enterprise database, or negative permissions, e.g., restrictions on accessing certain websites. Example permissions include one or more of permission to access one or more websites, restrictions on accessing one or more websites, read permission in a remote document storage unit, or write permission in a remote document storage unit. The policy settings storage module 128 may include device policies 130 or user policies 132.1-n. Device policies 130 may include global permissions associated with all users of the device, while each user policy 132.1-n may be associated with a specific user account of the client computing device.

In one implementation, the user policies 132.1-n may be different for each user. For example, the client computing device 118 may have two users, a husband and a wife. The user policy 132.1 for the husband may specify, among other things, that the husband has permission to access a corporate intranet associated with the husband's employer, while the user policy 132.2 for the wife may specify that the wife lacks permission to access the corporate intranet associated with the husband's employer.

In one aspect, the device policies 130 may be associated with a first enterprise, and the user policies 132.1 may be associated with a second enterprise, different from the first enterprise. For example, a wife may receive a device (e.g., client computing device 118) subject to the device policies 130 associated with a first enterprise, her employer. A husband may log into the device of the wife using his login credentials with a second enterprise, his employer. During the husband's session on the device, both the device policies 130, associated with the first enterprise, and the user policies 132.1, associated with the second enterprise, may be enforced. However, in one implementation, the policies associated with the first enterprise may deny or preclude the installation of the policies associated with the second enterprise, and, thus, the husband may be unable to install the policies associated with the second enterprise on the device.

The policy settings storage module 128 may be secured by both a public key of a server (e.g., public key 116 of server machine 102) that provided the policy settings and a signature of the client computing device 118. The signature of the client computing device 118 may be uniquely associated with the client computing device 118. The combination of the public key of the server and the signature of the client computing device 118 ensures that the client computing device 118 may verify that the policy settings stored thereon are authentic and the source of the policy settings. Also, a malicious virus or attack including policy settings may be prevented because the policy settings transmitted by the attacker may lack the public key of the server. Importantly, a user of the client computing device 118 may be unable to move or copy the policy settings 130 or 132.1-n from the policy settings storage module 128 because the policy settings may be signed with a signature of the client computing device 118, which may uniquely associate the policy settings 130 or 132.1-n with the client computing device.

Figure 2:
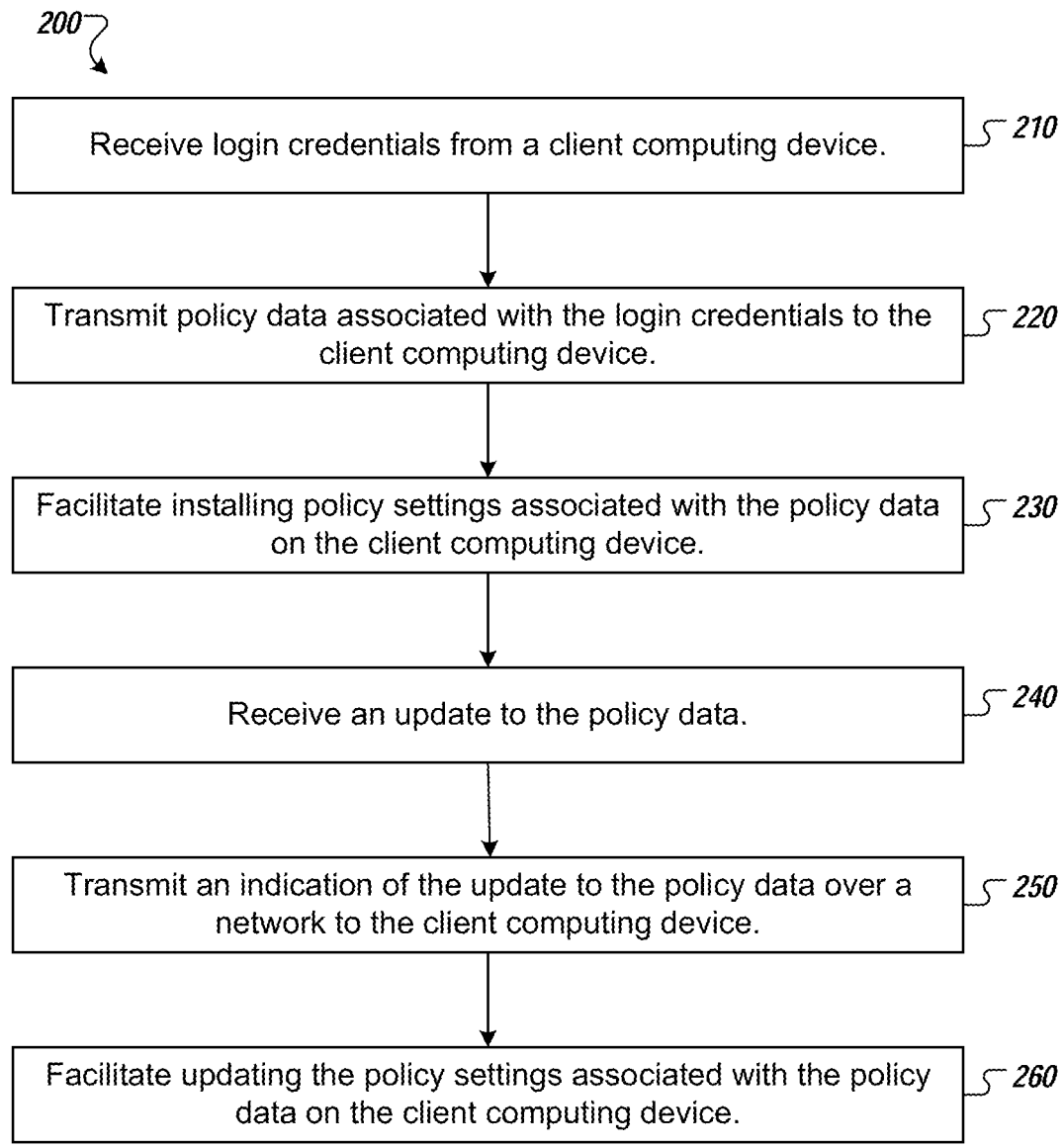
FIG. 2 illustrates an example process by which policy settings may be transmitted to client computing devices.

FIG. 2 illustrates an example process 200 by which policy settings may be transmitted to client computing devices.

The process 200 begins at step 210, where the server machine receives login credentials from a client computing device. The login credentials may include cloud-based or cloud-aware login credentials. The login credentials may be associated with an operating system of the client computing device. The login credentials may be entered when a user starts up the client computing device. The client computing device may be an enterprise device. Alternatively, the client computing device may not be an enterprise device or may be associated with an enterprise different from an enterprise associated with the server machine. The client computing device may be associated with the login credentials of an enterprise account. In one implementation, the server machine may receive information identifying an enterprise account associated with either the client computing device or a user of the client computing device in place of the login credentials.

According to step 220, the server machine transmits policy data associated with the login credentials to the client computing device. The server machine may select the policy data based on the login credentials. The policy data may identify policy settings to be installed on the client computing device. The policy settings may include four or more of compliance settings, behavioral settings, software applications, permission to access one or more websites, restrictions on accessing one or more websites, read permission in a remote document storage unit, or write permission in a remote document storage. The policy data may be transmitted over a network. The network may be a network associated with an enterprise creating the policy data, for example, an intranet or a virtual private network (VPN). Alternatively, the network may be a public network that is not associated with an enterprise creating the policy data, such as the Internet or a cellular network (e.g., a 3G network). Importantly, modifications for enterprise permissions may be received on the client computing device while the client computing device is not connected to a network associated with the enterprise.

The policy settings identified in the policy data may be installed on the client computing device. The policy settings may include device policy settings for all users of the client computing device or user policy settings for a specific user of the client computing device. One example of device policy settings may be an operating system update for all users of the client computing device, for example, to correct a security breach. One example of user policy settings may be permission for a user to read or write data in a database. It should be noted that, if the client computing device has multiple users, the user policy settings my be different for all users of the client computing device. For example, a first user of the client computing device may have permission to access a resource, (e.g., to read or write data in the database) while a second user may lack permission to access the resource.

According to step 230, the server machine receives an update to the policy data. In an enterprise implementation, the update to the policy data may be based on updated policy settings created by an administrator.

According to step 240, the server machine transmits and indication of the update to the policy data over a network to the client computing device. The update to the policy data may identify an update to policy settings to be installed on the client computing device. In one implementation, the server machine may transmit the indication of the update to the policy data to multiple client computing devices. The indication of the update to the policy data may include updated policy data, new policy data, or the portion of the policy data to which the update applies. The network may be a network associated with an enterprise creating the policy data, for example, an intranet or a virtual private network (VPN). Alternatively, the network may be a public network that is not associated with an enterprise creating the policy data, such as the Internet or a cellular network (e.g., a 3G network). Importantly, updates for enterprise policy settings may be received on the client computing device while the client computing device is not connected to a network associated with the enterprise. After the update to the policy data is received by the client computing device, the policy settings on the client computing device may be updated according to the policy settings identified by the policy data. After step 240, the process 200 ends.

Figure 3:
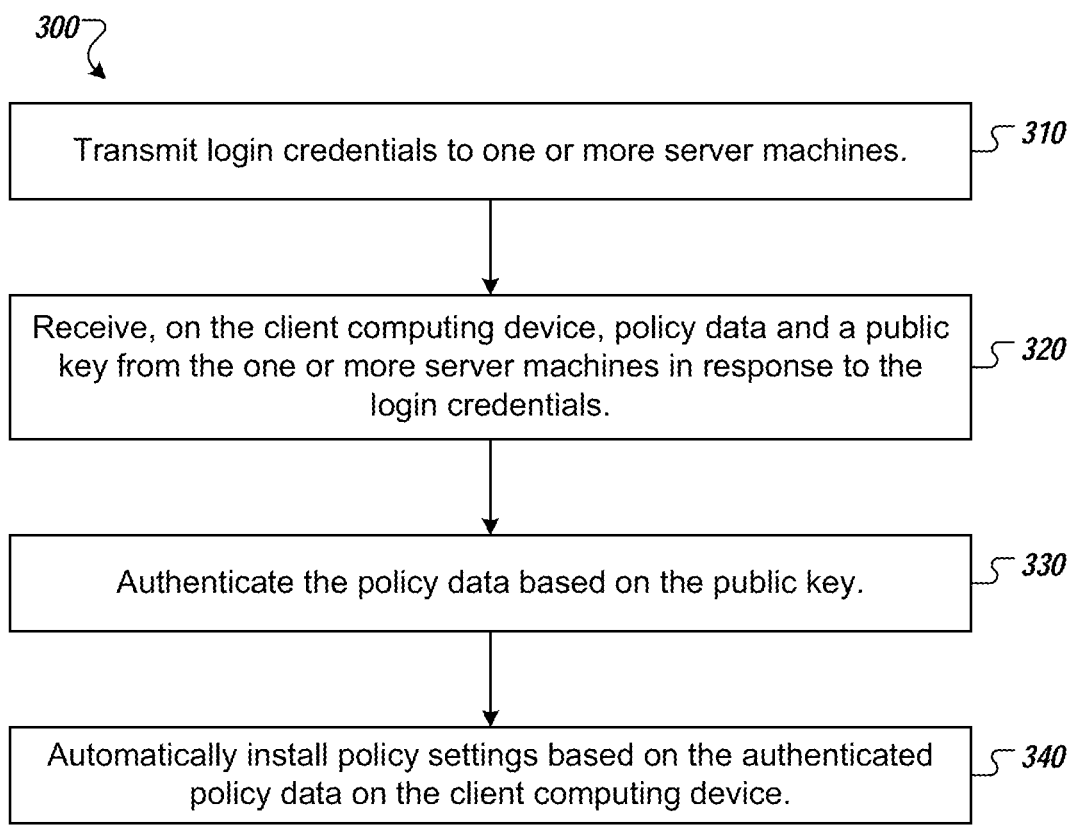
FIG. 3 illustrates an example process by which policy settings may be configured on client computing devices.

FIG. 3 illustrates an example process 300 by which policy settings may be configured on client computing devices.

The process 300 begins at step 310, where the client computing device transmits login credentials to one or more server machines. The login credentials may include cloud-based or cloud-aware login credentials. The login credentials may be associated with an operating system of the client computing device. The login credentials may be entered when a user starts up the client computing device. The client computing device may be an enterprise device. Alternatively, the client computing device may not be an enterprise device, but may be associated with the login credentials of an enterprise account. The one or more server machines may include a single server machine, multiple server machines, or a server farm. In one implementation, the client computing device may transmit information identifying an enterprise account associated with either the client computing device or a user of the client computing device in place of the login credentials.

According to step 320, the client computing device receives policy data and a public key from the one or more server machines in response to the login credentials or the information identifying the enterprise account. The policy data may be signed with the public key or may include the public key.

According to step 330, the client computing device authenticates the policy data based on the public key. The client computing device may authenticate the policy data in order to verify that the policy data is from the server machine or another trusted source. As a result, policy settings based on policy data transmitted by the server machine or another trusted source may be stored on the client computing device based on the public key. However, policy settings based on a policy data transmitted by an attacker may not be stored on the client computing device because the policy data transmitted by the attacker may lack the public key of the server machine.

According to step 340, the client computing device automatically installs policy settings based on the authenticated policy data on the client computing device. The policy settings may include global policy settings for one or more users of the client computing device (e.g., all the users of the client computing device). Alternatively, the policy settings may include user policy settings for a specified user of the client computing device. In one implementation, the client computing device may automatically install the policy settings based on the authenticated policy data of the client computing device by storing information based on the policy data in association with both a public key associated with the one or more server machines and a signature associated with the client computing device. As a result of the policy settings being associated with a signature associated with the client computing device, a user of the client computing device may be unable to move or copy the policy data on the client computing device to another device. The information based on the policy data may include the policy data itself or information derived based on the policy data. As a result, the client computing device may be able to verify the source or the authenticity of the policy settings stored thereon. After step 340, the process 300 ends.

Figure 4:
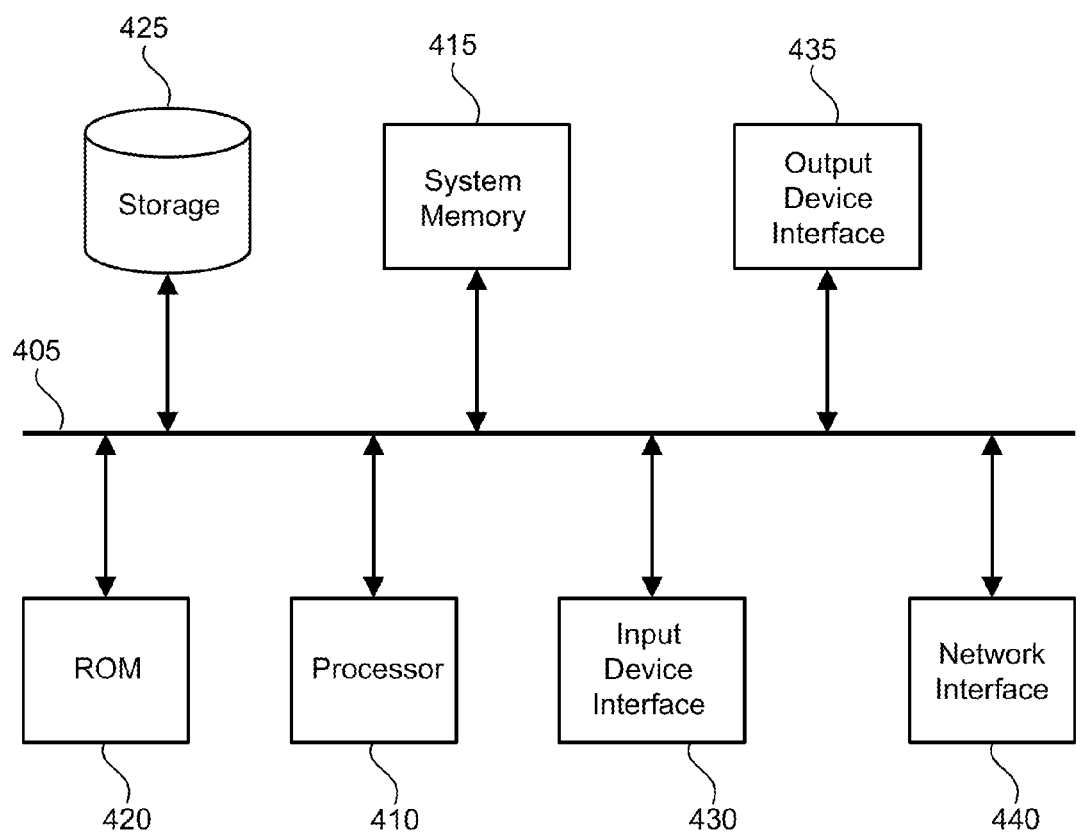
FIG. 4 conceptually illustrates an example electronic system with which some implementations of the subject technology are implemented.

FIG. 4 conceptually illustrates an electronic system 400 with which some implementations of the subject technology are implemented. For example, the server machine 102 or the client computing device 118 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data or instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for configuring policy settings on client computing devices in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the teens "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for installing policy settings on a client computing device, the method comprising:

receiving, on the client computing device, policy data and a public key from a server;
authenticating the policy data based on the public key;
installing policy settings in a module on the client computing device based on the authenticated policy data on the client computing device; and
securing, in response to installing the policy settings and without user interaction, the module based on the public key from the server and a signature generated on the client computing device, the signature uniquely associating the policy settings with the client computing device, wherein the securing prevents the policy settings from being moved or copied by a user of the client computing device.

2. The method of claim 1, wherein the policy settings identified by the policy data comprise one or more of: compliance settings, behavioral settings, software applications; permission to access one or more websites, restrictions on accessing one or more websites, read permission in a remote document storage unit, or write permission in a remote document storage unit.

3. The method of claim 1, wherein the module comprises user policy settings, wherein the user policy settings comprise policy settings for a first user of the client computing device, wherein the first user has permission to access a resource according to the user policy, and wherein a second user of the client computing device lacks permission to access the resource according to the user policy settings.

4. The method of claim 1, wherein the module comprises device policy settings associated with all user accounts of the client computing device.

5. The method of claim 1, wherein the server comprises one or more of: a single server machine, multiple server machines, or a server farm.

6. The method of claim 1, further comprising:
transmitting login credentials to the server, wherein the policy data and the public key from the server are received, on the client computing device, in response to the login credentials.

7. The method of claim 1, further comprising:
transmitting information identifying an enterprise account of the user of the client computing device to the server, wherein the policy data and the public key from the server are received, on the client computing device, in response to the information identifying the enterprise account.

8. The method of claim 1, wherein the resource comprises a corporate intranet.

9. A non-transitory computer-readable medium for installing policy settings on a computer, the computer-readable medium comprising instructions that, when executed by the computer, cause the computer to:

receive, on the computer, policy data signed with a public key from a server;
authenticate the policy data based on the public key;
install policy settings in a module on the computer based on the authenticated policy data on the computer; and
securing, in response to installing the policy settings and without user interaction, the module based on the public key from the server and a signature generated on the computer, the signature uniquely associating the policy settings with the computer, wherein the securing prevents the policy settings from being moved or copied by a user of the computer.

10. The non-transitory computer-readable medium of claim 9, wherein the policy settings comprise one or more of: compliance settings, behavioral settings, software applications, permission to access one or more websites, restrictions on accessing one or more websites, read permission in a remote document storage unit, or write permission in a remote document storage unit.

11. The non-transitory computer-readable medium of claim 9, wherein the module comprises user policy settings, wherein the user policy settings comprise policy settings for a first user of the computer, wherein the first user has permission to access a resource according to the user policy settings, and wherein a second user of the computer lacks permission to access the resource according to the user policy settings.

12. The non-transitory computer-readable medium of claim 9, wherein the module comprises device policy settings associated with all user accounts of the computer.

13. The non-transitory computer-readable medium of claim 9, wherein the server comprises one or more of: a single server machine, multiple server machines, or a server farm.

14. The non-transitory computer-readable medium of claim 9, further comprising:
   transmitting login credentials to the server, wherein the policy data and the public key from the server are received, on the client computing device, in response to the login credentials.

15. The non-transitory computer-readable medium of claim 9, further comprising instructions that, when executed by the computer, cause the computer to:
   transmit information identifying an enterprise account of the user of the client computing device to the server, wherein the policy data and the public key from the server are received, on the client computing device, in response to the information identifying the enterprise account.

16. The non-transitory computer-readable medium of claim 9, wherein the resource comprises a corporate intranet.

17. A client computing device comprising:
one or more processors; and
a memory comprising instructions which, when executed by the one or more processors, cause the one or more processors to implement a method, the method comprising:
   receiving, at the one or more processors, policy data and a public key from a server;
   installing policy settings in a module on the client computing device based on the policy data on the client computing device; and
   securing, in response to installing the policy settings and without user interaction, the module based on the public key from the server and a signature generated on the client computing device, the signature uniquely associating the policy settings with the client computing device, wherein the securing prevents the policy settings from being moved or copied by a user of the client computing device.

18. The client computing device of claim 17, wherein the policy settings identified by the policy data comprise one or more of: compliance settings, behavioral settings, software applications, permission to access one or more websites, restrictions on accessing one or more websites, read permission in a remote document storage unit, or write permission in a remote document storage unit.

19. The client computing device of claim 17, wherein the module comprises user policy settings, wherein the user policy settings comprise policy settings for a first user of the client computing device, wherein the first user has permission to access a resource according to the user policy, and wherein a second user of the client computing device lacks permission to access the resource according to the user policy settings.

20. The client computing device of claim 17, wherein the module comprises device policy settings associated with all user accounts of the client computing device.

* * * * *